United States Patent [19]

Sullivan

[11] 4,031,847

[45] June 28, 1977

[54] PRESSURE RATIO REVERSAL INDICATOR

[75] Inventor: Bruce M. Sullivan, Burnsville, Minn.

[73] Assignee: Donaldson Company, Inc., Minneapolis, Minn.

[22] Filed: Apr. 21, 1976

[21] Appl. No.: 679,064

[52] U.S. Cl. .......................... 116/65; 116/114 PV
[51] Int. Cl.² ............................................ G08B 5/06
[58] Field of Search ......... 116/65, 114 PV, DIG. 7, 116/34 R, 70; 73/406

[56] References Cited

UNITED STATES PATENTS

| | | | |
|---|---|---|---|
| 3,246,624 | 4/1966 | Lowther | 116/114 PV |
| 3,381,651 | 5/1968 | McKinlay | 116/114 PV |
| 3,402,690 | 9/1968 | Willis | 116/114 PV |
| 3,465,707 | 9/1969 | Kashiwaba | 116/34 R |

Primary Examiner—S. Clement Swisher
Assistant Examiner—Denis E. Corr
Attorney, Agent, or Firm—Merchant, Gould, Smith, Edell, Welter & Schmidt

[57] ABSTRACT

An improved arrangement for responding to reversal in the sense of the ratio between two pressures. In a housing there is located a generally cup-shaped indicator element of resilient, air impermeable material including a slack diaphragm having a central area of augmented visibility and an integral tongue projecting obliquely therefrom. The diaphragm is self-biased in either of two positions, in one of which the tongue conceals the central area, and in the other of which the tongue exposes the area. Pressures to be compared are applied on opposite sides of the diaphragm, and an observation window is provided.

9 Claims, 4 Drawing Figures

PRESSURE RATIO REVERSAL INDICATOR

BACKGROUND OF THE INVENTION

This invention relates to the field of pneumatics, and particularly to arrangements for indicating reversal in the sense of the ratio of a pair of pressures of interest.

Proportional apparatus for giving indications which vary with the magnitude of the ratio of two pressures are known. There are, however, occasions when the need is not for continuous monitoring of pressure ratio, but merely for an indication that such a ratio has reversed in sense. One application for such an indication is found in the co-pending application of Erland D. Anderson, et al, Ser. No. 588,291, filed June 19, 1975, and assigned to the assigneed of the present application.

SUMMARY OF THE INVENTION

My invention comprises a new and improved generally cup-shaped indicator element of resilient, air impermeable material having a slack diaphragm with a central area of augmented visibility and an opaque tongue wider and longer than the central area and extending from the diaphragm at an oblique angle with respect thereto. The diaphragm can assume either a first inward position, in which the surface bearing said area and said tongue is convex and said tongue exposes said area, or a second, outward position, in which said surface is concave and said tongue conceals said area, although said oblique angle does not change materially. The diaphragm self-biases itself in each of said positions. The diaphragm may be mounted where it is subject to a pressure differential which tends to maintain it in its first position: if the pressure differential reverses and is of magnitude to overcome the self-bias of the diaphragm, the latter switches to its other position, and the concealment of said area gives indication of that pressure reversal even if the pressure in the new sense later reduces to zero.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION OF THE PREFERRED EMBODIMENT

Figure 1:
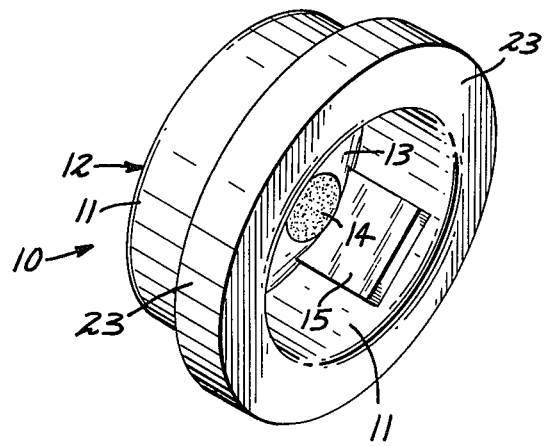
FIG. 1 is a perspective view of the special diaphragm structure according to my invention.
Figure 2:
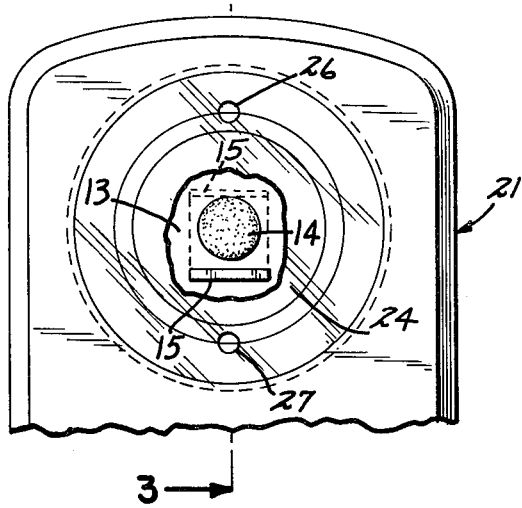
FIG. 2 is a fragmentary plan view of the structure installed.
Figure 4:
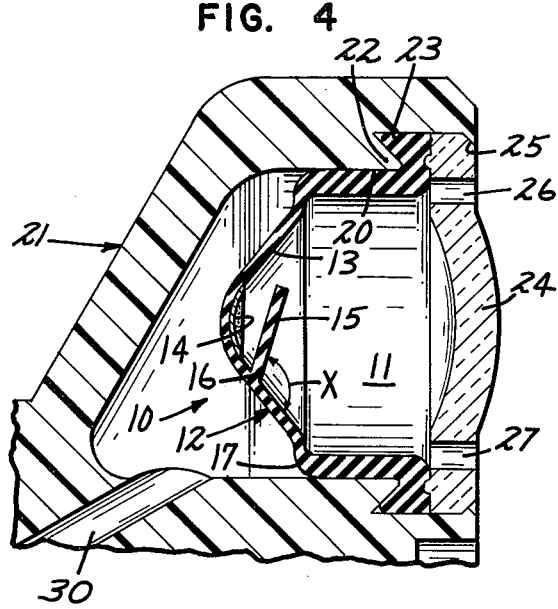
FIGS. 3 and 4 are sectional views along the line 3—3 of FIG. 2 in the first and second positions of the structure respectively.
Figure 3:
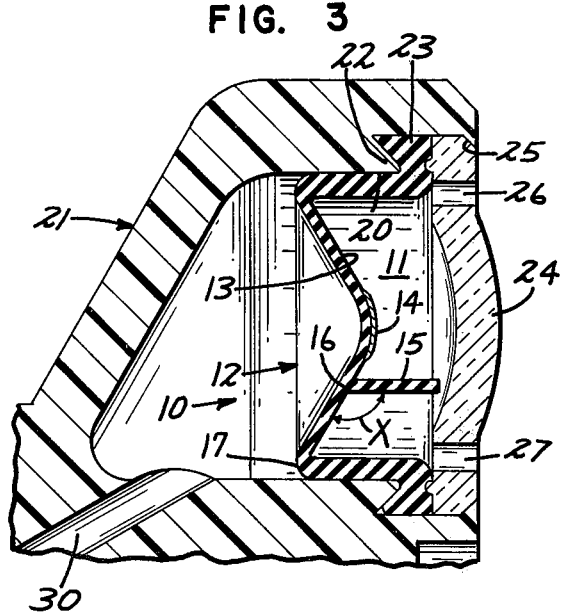

My improved diaphragm structures comprise a generally cup-shaped element 10 of resilient, air impermeable material. Element 10 has a tubular body 11 closed at one end by a slack diaphragm 12. The inner surface 13 of the diaphragm carries a central area 14 of augmented visibility, and from that surface a tongue 15 projects at an oblique angle X. The diaphragm is capable of assuming either of two positions in which it self-biases itself: in a first, inward position, surface 13 is convex and in a second, outward position, surface 13 is concave. When surface 13 is convex as shown in FIGS. 1–3, tongue 15 exposes area 14 to view. When surface 13 is concave, as shown in FIG. 4, tongue 15, by reason of its width, length and opacity, conceals area 14 from view. The junction 16 between tongue 15 and diaphragm 12 is sufficiently spaced from the junction 17 between the diaphragm and tubular member 11 that the angle X is substantially the same in both positions of the diaphragm. As seen in FIG. 2, tongue 15 is flat and its intersection with surface 13 is perpendicular to a radius of the tubular member.

Element 10 is mounted in a cavity 20 in a housing 21 by cooperation of a shoulder 22 surrounding the cavity with a rim 23 at the outer end of member 12. An airtight seal exists between member 11 and cavity 20, and is maintained by a transparent window 24 retained in housing 21 in any suitable fashion, as by deformation of the housing over a bevel 25 on the window. A pair of small apertures 26, 27 are provided in window 24 to allow the space within element 10 to remain at ambient pressure. Housing 21 is provided with further aperture means 30 by which a second pressure may be conducted to the outside of element 10, to act on the surface of diaphragm 12 opposite to surface 13.

OPERATION

When the diaphragm is installed in a location where the pressure supplied through apertures 26, 27 is intended to be no greater than the pressure supplied through aperture 30, the diaphragm is normally in its first position shown in FIGS. 2 and 3, in which tongue 15 exposes area 14 to the view of one looking through the window. This situation continues without change or supervision regardless of changes in the absolute magnitudes of the pressures involved, as long as the relative sense of the pressures does not change. However, if the pressure supplied at apertures 26, 27 becomes greater than that supplied at aperture 30 by more than the bias of diaphragm 12, the diaphragm switches to its second position, shown in FIG. 4. Note that, although the angle X has not changed, tongue 15 now conceals area 14 from view through window 24, indicating that the pressure ratio has reversed. This indication continues regardless of changes in the absolute magnitudes of the pressures, or their fall to zero.

The diaphragm can equally as well be installed in locations where the pressure supplied through apertures 26, 27 is intended to be no less than that supplied through aperture 30. The diaphragm then is normally in its second position, shown in FIG. 4, in which tongue 15 conceals area 14 from the view of one looking through window 24. This situation continues without change or supervision regardless of changes in the absolute magnitudes of the pressures involved, as long as the relative sense of the pressures does not change. However, if the pressure supplied at apertures 26, 27 becomes less than that supplied at aperture 30 by more than the bias of diaphragm 12, the diaphragm switches to its first position, shown in FIGS. 2 and 3. Note that although angle X has not changed, tongue 15 now exposes area 14 to view through window 24, indicating that the pressure ratio has reversed. This indication continues regardless of changes in the absolute magnitudes of the pressures, or their fall to zero.

Thus, the diaphragm can be used for detecting reversals of pressure ratio in either sense, the only difference being the interpretation placed on whether area 14 is visible or not. In the first case, the condition being monitored is normal if area 14 is displayed, while in the second case the condition is normal if area 14 is concealed.

From the foregoing, it will be evident that I have invented a new and improved indicator of pressure ratio reversal, which is inexpensive, easily observed, easily installed, and easily reset, either by a suitable syringe or by the user's lung power.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A generally cup-shaped indicator element of resilient, air impermeable material comprising:
   a tubular wall member
   a slack diaphragm closing one end of said member and movable into either an inward or an outward position with respect thereto, said diaphragm having an inner surface which is convex in said inward position of said diaphragm and concave in said outward position of said diaphragm;
   a limited central area of augmented visibility on said inner surface of said diaphragm;
   and an opaque tongue integral with said diaphragm, wider and longer than said central area, and extending from said inner surface, at an oblique angle with respect thereto, at a location spaced from said tubular member and said central area,
   so that in said outward position of said diaphragm said tongue overhangs and conceals said area, while in said inward position of said diaphragm said tongue exposes said area, when viewed looking toward said inner surface.

2. The structure of claim 1 together with a housing engaged by said tubular wall, means including a transparent window for securing said element in said housing and enabling observation of said inner surface, and means for applying two pressures to be compared to the inside and outside, respectively, of said element.

3. The structure of claim 1 in which the length of said tongue is of the same order of magnitude as the length of said tubular wall member.

4. The structure of claim 1 in which said tongue is substantially flat and its intersection with said inner surface is substantially perpendicular to a radius of said tubular member, so that the oblique angle between said tongue and said surface is substantially the same in the inward and outward positions of the diaphragm.

5. The structure of claim 1 in which said diaphragm is self-biased in each of said positions so that opposite pressure differentials of predetermined value are effective to cause the diaphragm to switch between said positions, the diaphrgam remaining in either position regardless of variation in the absolute values of the pressures unless the sense of their ratio reverses.

6. In combination:
   a housing having a cavity surrounded by a shoulder;
   a generally cup-shaped indicator element of resilient, air impermeable material comprising a tubular wall member outwardly engaging said cavity, a rim surrounding said wall member at one end thereof to engage said shoulder, a slack diaphragm closing the other end of said member and movable into either an outward or an inward, normal position with respect thereto, a central area of augmented visibility on the inner surface of said diaphragm, and a tongue wider and longer than said central area and extending from said inner surface at an oblique angle with respect thereto, at a location radially inward from said tubular member, so that in said outward position of said diaphragm said tongue conceals said area, while in said inward position of said diaphragm said tongue exposes said area;
   a transparent window closing said first end of said diaphragm in engagement with said rim;
   means retaining said window in said housing to maintain said element in position therein;
   first aperture means in said housing to which a first pressure may be applied to one side of said diaphragm;
   and second aperture means in said window through which a second pressure may be applied to the other side of said diaphragm,
   so that when said diaphragm is in said normal position and a pressure is supplied through said first aperture means which exceeds a pressure applied through said second aperture means by more than a fixed amount, said diaphragm switches and said tongue exposes said central area.

7. In combination:
   a slack diaphragm of resilient, air impermeable material displaceable between a first position in which one surface thereof is convex and a second position in which said one surface is concave;
   a central area of augmented visibility on said one surface;
   and an opaque tongue integral with said diaphragm at a location spaced outwardly from said area, said tongue being wider and longer than said area and extending from said one surface, at an oblique angle with respect thereto,
   so that when viewed looking toward said surface said tongue exposes said area in the first position of the diaphragm, and overhangs and conceals said area in the second position of the diaphragm.

8. In an indicator having a slack diaphragm on opposite sides of which are applied pressures to be compared, said diaphragm being movable between a first position, in which one surface thereof is concave, and a second position, in which said surface is convex, and which diaphragm is self-biased in each of said positions, said diaphragm having a central area of augmented visibility on said one surface, the improvement which comprises:
   an opaque tongue integral with said diaphragm at a location spaced outwardly from said area, said tongue being wider and longer than said central area, and extending from said surface, at an oblique angle with respect thereto, said oblique angle being substantially the same in both positions of said diaphragm, so that when said surface is concave said tongue overhangs and conceals said area, and when said surface is convex said tongue exposes said area.

9. The method of indicating reversal in the relative sense of two pressures which comprises causing to change from concave to convex a slack diaphragm having a central area of augmented visibility which is thereupon revealed by a tongue projecting obliquely from said diaphragm and initially concealing said area.

* * * * *